United States Patent
Baader et al.

[15] 3,689,579
[45] Sept. 5, 1972

[54] PROCESS FOR THE MANUFACUTRE OF 2-CHLOROBUTADIENE-(1,3)

[72] Inventors: Herbert Baader, Hermulheim near Cologne; Kurt Sennewald, Knapsack near Cologne; Helmut Reis, Hurth near Cologne; Günther Viertel, Bruhl near Cologne, all of Germany

[73] Assignee: Knapsack Aktiengesellschaft, Knapsack near Cologne, Germany

[22] Filed: Oct. 31, 1966

[21] Appl. No.: 590,731

[30] Foreign Application Priority Data
Nov. 20, 1965 Germany..................................

[52] U.S. Cl.................................................260/655
[51] Int. Cl..............................................C07c 21/20
[58] Field of Search........................................260/655

[56] References Cited
UNITED STATES PATENTS

| | | |
|---|---|---|
| 2,381,038 | 8/1945 | Carter et al................260/655 |
| 2,524,383 | 10/1950 | Hearne et al..............260/655 |
| 3,275,531 | 9/1966 | Sennewald et al.........260/655 |
| 2,332,778 | 8/1941 | Buc et al................260/654 D |
| 2,391,827 | 12/1945 | Hearne et al..............260/655 |

*Primary Examiner*—Leon Zitver
*Assistant Examiner*—Joseph A. Boska
*Attorney*—Connolly and Hutz

[57] ABSTRACT

Process for converting 1,3-dichlorobutene-(2) to 2-chlorobutadiene-(1,3) by uncatalyzed dehydrochlorination of the previously vaporized reactant for a period not exceeding 10 seconds and at a temperature of 450°–650° c, the resulting gases being immediately cooled to a temperature of 0°–35° c by quenching and substantially pure product recovered from the quenching liquid.

9 Claims, 1 Drawing Figure

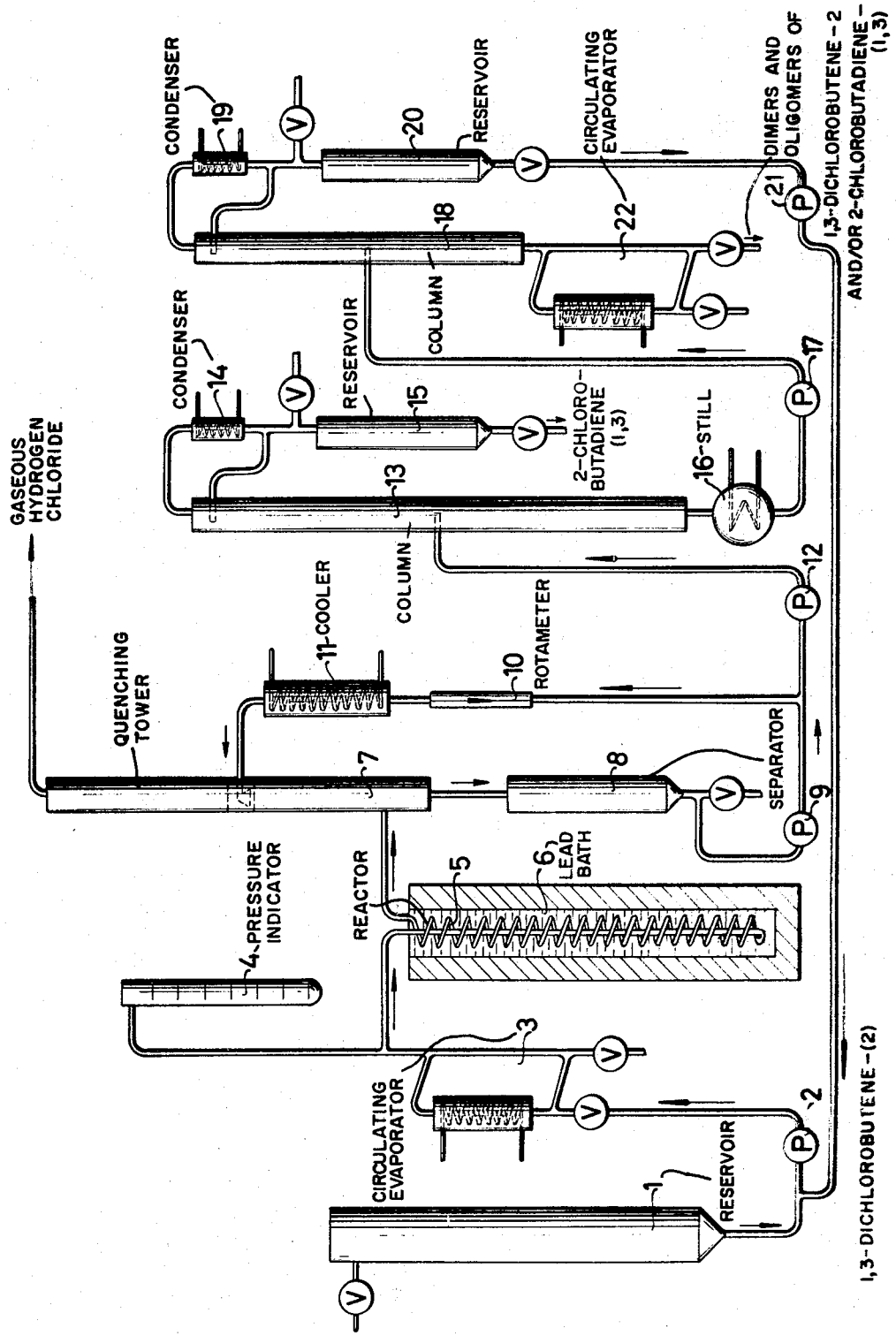

PROCESS FOR THE MANUFACUTRE OF 2-CHLOROBUTADIENE-(1,3)

The present invention relates to a process for the manufacture of 2-chlorobutadiene-(1,3) by subjecting 1,3-dichlorobutene-(2) in vapor form to thermal dehydrochlorination in a reaction zone heated to a temperature varying between about 450° and about 650°C.

2-Chlorobutadiene-(1,3) is an important starting material for making polymers with commercially attractive properties, and it is produced predominantly from monovinylacetylene by the additive combination with hydrogen chloride. This process is noted to entail the formation of relatively large amounts of 1,3-dichlorobutene-(2) as a by-product which is obtained by the additive combination of hydrogen chloride with formed 2-chlorobutadiene-(1,3) or 4-chlorobutadiene-(1,2).

Processes have already been described which enable 1,3-dichlorobutene-(2) to be dehydrochlorinated and 2-chlorobutadiene-(1,3) to be recovered thereby, e.g. by means of an alkali metal hydroxide. However, the alkali metal chloride produced in this process is found to be useless therein U.S. Pat. No. 2,391,827 also describes a process for the dehydrochlorination of 1,3-dichlorobutene-(2) at a temperature of 532°C, but his process is found to produce 2-chlorobutadiene-(1,3) in a yield as small as 40 percent, and it has the disadvantage of a considerable portion of the 1,3-dichlorobutene-(2) used being lost during the reaction, due to resinification and polymerization.

Essentially better results are obtained by the catalytic dehydrochlorination carried out in the presence of a $BaCL_2/CuCl_2$-catalyst. However, this process cannot be used for the continuous manufacture of 2-chlorobutadiene-(1,3) because the catalyst is found to become resinified soon, and the regeneration of the catalyst, e.g. by calcining the resinified catalyst, is found not to restore the initial catalyst activity; the activity of the catalyst is even found to decrease very considerably after each regeneration.

In British Pat. No. 825,609, it has therefore been proposed to use a metal chloride as the catalyst, preferably $Cu_2Cl_2$, $CuCl_2$ or $ZnCl_2$ dissolved in tricresyl phosphate or nitrobenzene. However, the yields obtainable by this process were found again to be as low as 65.8 percent in the presence of a $Cu_2Cl_2$/tricresyl phosphate-catalyst, and to be as low as 62 percent in the presence of a $ZnCl_2$/nitrobenzene-catalyst.

The manufacture of 2-chlorobutadiene-(1,3) from monovinylacetylene is noted to entail the formation of large amounts of 1,3-dichlorobutene-(2) as a by-product, and for this reason alone it has been highly desirable to develop a commercially attractive process enabling 2-chlorobutadiene-(1,3) to be produced in good yields from 1,3-dichlorobutene-(2), at fairly small losses of substance.

An important factor is also seen to reside in the fact that the pyrolysis of trichlorobutanes results in the formation of 1,3-dichlorobutene-(2) as in intermediary, which in other words is an essential preliminary stage leading to 2-chlorobutadiene-(1,3), and this in turn has been an invitation to experiments which resulted in the process of the present invention.

The process of the present invention can be carried out using the apparatus shown diagrammatically in the accompanying drawing. Referring to the drawing: 1,3-dichlorobutene-(2) is conveyed from reservoir 1 by means of pump 2 to circulating evaporator 3, in which the 1,3-dichlorobutene(2) is evaporated at the rate of 4.8 kg/hr at a temperature of 140°C under a pressure of about 910 mm mercury (pressure indicating means 4). The gaseous 1,3-dichlorobutene-(2) is then introduced into reactor 5, formed of a quartz, nickel or stainless steel tube and placed in a lead bath 6 to be heated therein to a temperature of 570°C. Hot reaction gas leaving reactor 5 is introduced at a temperature of 550°C into quenching tower 7 to be quenched therein with liquefied reaction gas having a temperature of 25°C and circulated through separator 8, pump 9, flow or volumeter (rotameter) 10, and cooler 11. Gaseous hydrogen chloride is withdrawn at the head of quenching tower 7, scrubbed or distilled in conventional manner, and then obtained in pure form. Between pump 9 and rotameter 10, a portion of the liquid reaction product is conveyed by means of pump 12 to approximately the center portion of column 13, at the head of which 0.88 kg/hr 2-chlorobutadiene-(1,3) is removed at a temperature of 59.4°C and withdrawn through condenser 14 and reservoir 15, being attached to column 13. For stabilizing the 2-chlorobutadiene-(1,3), the material refluxed in column 13 can be mixed with up to 0.5 percent by weight N-nitroso-diphenylamine and/or phenothiazine and/or a further known stabilizer. The product accumulating in the sump of column 13 is withdrawn from still 16 and conveyed by means of pump 17 approximately to the center portion of column 18, at the head of which unreacted 1,3-dichlorobutene-(2) is condensed in condenser 19 and collected in reservoir 20 after withdrawal of a partial stream for reflux (reflux ration = 1:1). The unreacted 1,3-dichlorobutene-(2) collected in reservoir 20 is introduced according to requirements and by means of pump 21 into a feed line disposed between reservoir 1 and dosing pump 2. The sump product of column 18, formed of a readily movable liquid, possibly of dimers and oligomers of 1,3-dichlorobutene-(2) and/or 2-chlorobutadiene-(1,3), is continuously withdrawn from circulating evaporator 22.

The essential process steps thus comprise the dehydrochlorination in reactor 5 and the subsequent quenching of the reaction gas. The temperature range used for achieving the dehydrochlorination generally varies between 400° and 700°C, preferably between 540° and 620°C, the dehydrochlorination temperature selected being chiefly determined by the sojourn time. Higher temperatures call for shorter sojourn times when it is intended to prevent the material flowing through the reactor from undergoing resinification and coking and from obstructing the reactor. The sojourn times conveniently vary between 10 and 0.01 seconds, preferably between 5 and 0.05 seconds. The danger of coke and resins depositing under these conditions is but small, especially when the reactor outlet is heated up to the quenching tower. Cold reaction product which comes from the quenching cycle and may be stabilized with up to 0.5 percent by weight N-nitrosodiphenylamine and/or phenothiazine is caused continuously to trickle down the inner wall of the quenching tower, the formation or deposition of polymerization residues being thus avoided.

While the dehydrochlorination of 1,3-dichlorobutene-(2) into 2-chlorobutadiene-(1,3) has been reported in the U.S. Pat. No. 2,391,827 to produce a 40 percent yield at a dehydrochlorination temperature of 532°C, it has now unexpectedly been found that 2-chlorobutadiene-(1,3) can be obtained by the present invention in a yield higher than 85 percent, the loss of reacted substance noted during an operation period of 77 hours being not higher than 2.1 percent.

This is believed to be partially attributable to the hot reaction gas which has a temperature of 550°C being cooled instantaneously down to room temperature varying between about 10° and 30°C, in the quenching tower. This results in the quenching being achieved within fractions of a second and in the polymerization-promoting surface being covered with a film of quenching liquid, which means that polymerization is scarcely noted. In this connection, it is remarkable that the present process, carried out at a temperature of 550°C, is noted to entail lesser substance loss originating from coking and cracking than the process described in U.S. Pat. No. 2,391,827, carried out at a temperature of 530°C. This is no strange result in view of the sojourn times proposed in the art which teaches allowing 1,3-dichlorobutene-(2) or the cleavage products comprising 2-chlorobutadiene-(1,3) and hydrogen chloride to remain in the reaction tube for a period of at least 25 minutes, as can readily be calculated from Example III of U.S. Pat. No. 2,391,827. It is clear that so long a sojourn period and so high a temperature result in a very large portion of formed 2-chlorobutadiene-(1,3) being resinified and coked. In the present process, however, the sojourn period comprises no more than a few seconds.

The sojourn time and temperature obviously determine the conversion rate at a given pressure. The reduction of the conversion rate by using milder reaction conditions is known in pyrolytic reactions to result in increased yields because the feed product then acts as a diluent. Unexpectedly, it has now been found that even slightly improved yields are obtained when the conversion rate is increased from 25 percent (Example 1) to more than 50 percent (Example 2). It would thus appear that the yield of 2-chlorobutadiene-(1,3) is only insignificantly influenced by pressure and conversion rate.

The present invention relates more particularly to a process for the manufacture of 2-chlorobutadiene-(1,3) by subjecting 1,3-dichlorobutene-(2) in vapor form to thermal dehydrochlorination in a reaction zone heated to a temperature varying between about 450° and about 650°C, which comprises causing the 1,3-dichlorobutene-(2) in vapor form to flow within a period of time varying between 0.01 and 10 seconds, preferably between 0.05 and 5 seconds, through the reaction zone and immediately quenching the resulting reaction gases leaving the reaction zone down to a temperature varying between 0° and 35°C.

An embodiment of the present process comprises evaporating the 1,3-dichlorobutene-(2) under slightly elevated pressure, causing it then to flow through a reaction tube or coil, heated to a temperature varying between 540° and 620°C, quenching the resulting hot reaction gases in a quenching zone by means of liquefied reaction product, at a temperature varying between about 10° and about 30°C, withdrawing gaseous hydrogen chloride at the head of the quenching zone, separating the liquefied reaction product at the bottom portion of the quenching zone, recycling a portion of the liquefied reaction product through a cooling zone into the quenching zone and spraying it therein, introducing the remaining portion of the liquefied reaction product into a first heated distillation zone, distilling off pure 2-chlorobutadiene-(1,3) at the head of that first distillation zone, introducing product obtained in the sump portion of the first distillation zone into a second heated distillation zone, withdrawing product accumulating in the sump portion of the second distillation zone, distilling off unreacted 1,3-dichlorobutene-(2) at the head of the second distillation zone, evaporating anew the unreacted 1,3-dichlorobutene-(2), and returning it to the reaction tube. The liquefied product can be sprayed inside the quenching zone while adding N-nitrosodiphenylamine and/or phenothiazine as a stabilizer.

It is also possible to reflux to the head of the first distillation zone a portion of the 2-chlorobutadiene-(1,3) distilled off from the first distillation zone, N-nitrosodiphenylamine and/or phenothiazine being added as a stabilizer to the refluxed portion.

A further embodiment of the process) of the present invention comprises causing the 1,3-dichlorobutene-(2) in vapor form to flow under reduced pressure through a reaction tube or coil heated to a temperature varying between 540° and 620°C, freeing the hot reaction gases from hydrogen chloride by water-scrubbing them at a temperature varying between 0° and about 20°C and liquefying the reaction gases, isolating the resulting liquid organic phase from the aqueous phase, and distilling off 2-chlorobutadiene-(1,3) from the organic phase.

EXAMPLE 1

11.7 kg (885.5 mols) 1,3-dichlorobutene-(2) were reacted within 77 hours in the apparatus described above. The reaction temperature was 570°C, and the material was allowed to remain for a period of less then 0.5 second in a stainless steel reaction tube or coil having a capacity of 420 cc. 66.85 kg (755.2 mols) 2-chlorobutadiene-(1,3 ) and 9.6 kg residue, formed of a readily movable, higher-boiling oil, were obtained. 31.8 kg (870 mols) hydrogen chloride were obtained simultaneously. A small portion of the hydrogen chloride is believed to have been formed by partial dehydrochlorination of the residue during the distillation. The loss of substance noted in this Example was 2.45 kg (about 2.1 percent of the material which underwent reaction). 2-Chlorobutadiene-(1,3) was accordingly obtained in a yield of 85.3 percent, referred to the 1,3-dichlorobutene-(2) which underwent reaction. The conversion rate was calculated to be about 25 percent per passage.

EXAMPLE 2

285 grams 1,3-dichlorobutene-(2) were caused to flow within 2 hours through a quartz reactor 56 cm long and 1.7 cm wide. The pressure prevailing inside the reactor was 100 mm mercury, the temperature was 550°C, and the sojourn time of the material in the reactor was less than 2 seconds. After the reactor, the reaction product obtained was introduced into ice water, quenched and simultaneously freed from hydrogen chloride. The organic phase was distilled and yielded 237 grams reaction product, of which 93.6 grams were 2-chlorobutadiene-(1,3) and 135.6 grams were unreacted 1,3-dichlorobutene-(2). 12 Grams residue, formed of a higher-boiling reaction product, were found in the reaction flask. 2-Chlorobutadiene-(1,3) was accordingly obtained in a yield of 88.4 percent, referred to the 1,3-dichlorobutene-(2) of which a 52.4 percent proportion underwent reaction.

We claim:

1. In the process for the manufacture of 2-chlorobutadiene-(1,3) by subjecting 1,3-dichlorobutene-(2) to thermal dehydrochlorination in a reaction zone heated to a temperature of about 450°–650°C, the improvement comprising passing vaporized 1,3-dichlorobutene-(2) through the reaction zone for 0.01–10 seconds and thereafter quenching the resulting product gases within a fraction of a second down to a temperature of about 0°–35°C.

2. The process of claim 1 wherein the 1,3-dichlorobutene-(2) is caused to flow through the reaction zone within a period of 0.05–5 seconds.

3. The process of claim 1, wherein the reaction zone is formed of a reaction tube.

4. The process of claim 1, wherein the reaction zone is formed of a tubular coil.

5. The process of claim 1, which comprises passing vaporized 1,3-dichlorobutene-(2) under reduced pressure through the reaction zone and thereafter instantly quenching the hot reaction gases by water-scrubbing at a temperature of about 0°–20°C to effect separation from hydrogen chloride, liquefying the remaining reaction gases, separating the resulting organic and aqueous phases, and recovering 2-chlorobutadiene-(1,3) from the organic phase.

6. The process of claim 1 wherein the reaction zone is maintained at about 540°C–620°C and the quenching of the resulting product gases from the reaction zone is effected by introducing a spray of cooled liquefied reaction product gases, the final 2-chlorobutadiene-1,3 product being recovered from the resulting mixture of liquefied product gases and quenching liquid.

7. The process of claim 6 wherein the liquefied reaction product is sprayed within the quenching means while adding a stabilizing amount of a member selected from the group consisting of N-nitrosodiphenylamine and phenothiazine.

8. The process of claim 6, which comprises evaporating the 1,3-dichlorobutene-(2) under slightly elevated pressure, causing it then to flow through a reaction zone heated to a temperature varying between 540° and 620°C, quenching the resulting hot reaction gases in a quenching zone by means of liquefied reaction product, at a temperature varying between about 10° and about 30°C, withdrawing gaseous hydrogen chloride at the head of the quenching zone, separating the liquefied reaction product at the bottom portion of the quenching zone, recycling a portion of the liquefied reaction product through a cooling zone into the quenching zone and spraying it therein, introducing the remaining portion of the liquefied reaction product into a first distillation zone, distilling off pure 2-chlorobutadiene-(1,3) at the head of that first distillation zone, introducing product obtained in the sump portion of the first distillation zone into a second heated distillation zone, withdrawing product accumulating in the sump portion of the second distillation zone, distilling off unreacted 1,3-dichlorobutene-(2) at the head of the second distillation zone, evaporating anew the unreacted 1,3-dichlorobutene-(2) and returning it to the reaction zone.

9. The process of claim 8, wherein a portion of the 2-chlorobutadiene-(1,3) distilled off from the first distillation zone is refluxed to the head of that zone, at least one member selected from the group consisting of N-nitrosodiphenylamine and phenothiazine being added to the refluxed portion as a stabilizer.

* * * * *